No. 857,898. PATENTED JUNE 25, 1907.
J. R. PEIRCE.
MACHINE FOR WORKING MARBLE.
APPLICATION FILED NOV. 10, 1906.

INVENTOR:
John Royden Peirce,

By Attorneys,

WITNESSES:

UNITED STATES PATENT OFFICE.

JOHN ROYDEN PEIRCE, OF NEW YORK, N. Y., ASSIGNOR TO ROYDEN MARBLE MACHINERY COMPANY, OF NEW YORK, N. Y., A CORPORATION OF NEW JERSEY.

MACHINE FOR WORKING MARBLE.

No. 857,898.     Specification of Letters Patent.     Patented June 25, 1907.

Original application filed April 25, 1906, Serial No. 313,584. Divided and this application filed November 10, 1906. Serial No. 342,815.

*To all whom it may concern:*

Be it known that I, JOHN ROYDEN PEIRCE, a citizen of the United States, residing in the borough of Manhattan, city, county, and State of New York, have invented certain new and useful Improvements in Machines for Working Marble or the Like, of which the following is a specification.

In numerous prior applications I have described apparatus for coping, molding, countersinking, rubbing and otherwise working marble and similar stones by means of carborundum or a similar material. Carborundum wheels revolve at a very high velocity, and it is generally necessary to supply large quantities of water. Consequently the wheel is generally enveloped in a thick mist or spray, especially at the point where the cutting is taking place, so that it is difficult for the workman to locate the stone so that the wheel will cut it along a desired line on the stone. Furthermore it is dangerous for the workmen to approach their heads or hands very close to the wheels or in line therewith, because of the liability of the wheels to be broken and to fly apart with great force.

The present invention provides a gage whereby the workman can locate the slab properly on the bed in order to cut along a desired line. Preferably the gage is designed to be attachable to and detachable from a variety of machines.

The accompanying drawings illustrate an embodiment of the invention.

Figure 1:
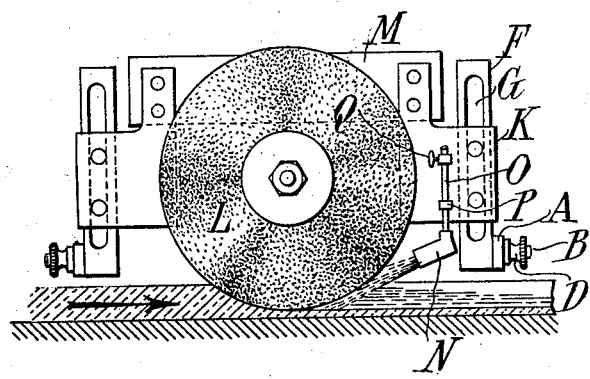
Figure 2:
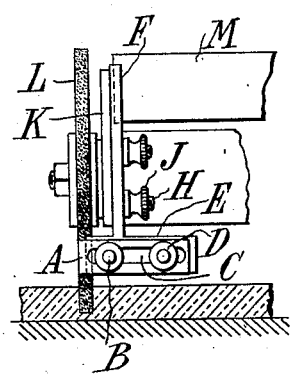
Figure 3:
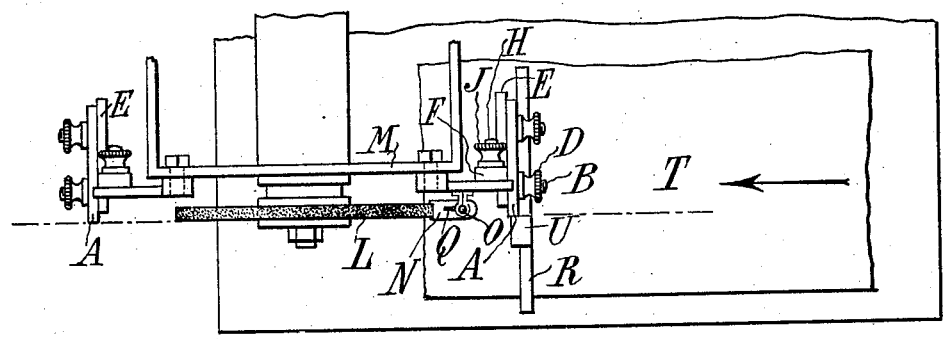
Figure 4:
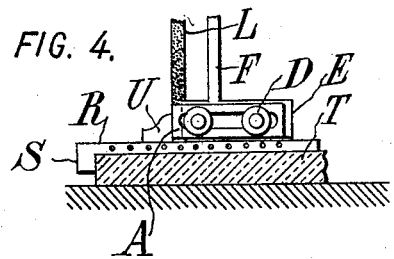

Figure 1 is a side elevation of the gage and nozzle applied upon a coping machine. Fig. 2 is an edge elevation of the same. Fig. 3 is a plan showing the method of using the gage. Fig. 4 is an end elevation also showing the gage in use.

Referring to the embodiment of the invention illustrated, there are preferably two gages, one on each side of the wheel, so as to be in advance thereof in feeding a slab to the wheel from either side. Of course where the feed is always in one direction, only one of the gages need be used. Each gage preferably stands normally above the marble and clear of the table, so as to avoid interference not only with the marble but with any projecting clamps.

The effective point of the gage is the end of a stop A, which is adjustable vertically for different thicknesses of marble, and horizontally for different thicknesses of the wheel, or for such slight differences in the position of the wheel as may occur in different machines. For example the stop A may be a bar which is supported by a pair of pins B fastened through the slot C of the bar so as to maintain its horizontality, while permitting adjustment, knurled nuts D being screwed on the pins B to clamp the stop A in position. The pins B are carried upon a horizontal arm E formed on or attached to the lower end of a vertical slide F, provided with a slot G through which a pair of guiding pins H pass, these pins being screw-threaded and provided with knurled nuts J for clamping the slide F at any desired elevation. The pins H are attached to an arm K projecting laterally a considerable distance beyond the edge of the wheel L, and fastened to the frame M of the machine.

A nozzle N, which is preferably in the form of a rose arranged to project a large quantity of water upon the marble as well as upon the wheel, and preferably at the point of contact of the two, is carried upon the lower end of a pipe O, to which a hose or other conduit is connected, the pipe O being adjustable in stirrups P arranged upon the arm K, and may be clamped in position by means of a thumb-screw Q in one of these stirrups.

In connection with the gages I preferably use a measuring tool R (Figs. 3 and 4.) This tool has a downwardly bent end S adapted to engage a finished edge of the marble T, and an upwardly projecting stop U which is adjustable along the measuring tool to correspond with any desired width of slab.

In starting a cut with a new wheel, the slide F having been raised or lowered a sufficient distance to permit the passage of the marble and clamps, a straight edge is laid along either face of the wheel, and the stops A brought up against this straight edge, so that they will be in line with such face of the wheel, as shown most clearly in Fig. 3. Thereupon the slab T of marble is laid on the bed with its forward portion under the stop A, and the tool R is laid thereon, and the slab is shifted until the upward projection U engages the stop A, after which the tool R is removed and the cutting proceeded with. The gages are adjustable for either face of the wheel, or for varying thicknesses thereof;

and the use of two gages adapts the machine for a wheel rotating in opposite directions and feeding from opposite sides.

The present application is a division of my previous application No. 313,584, filed April 25, 1906.

Though I have described with great particularity of detail a certain specific embodiment of my invention, yet it is not to be understood therefrom that the invention is limited to the specific embodiment disclosed. Various modifications thereof in detail, and in the arrangement and combination of the parts may be made by those skilled in the art, without departure from the invention.

What I claim is:—

1. The combination with a marble working machine having a rotating wheel of agglomerated material, of a gage adapted to be attached to the machine in line with the wheel and in advance thereof.

2. The combination with a marble working machine having a rotating wheel, of a gage adapted to be attached to the machine in line with the wheel and above the marble, and adapted to be laterally adjusted for different widths of the wheel.

3. The combination with a marble working machine having a rotating wheel, of a gage adapted to be attached to the machine in line with the wheel and above the marble, and adapted to be vertically adjusted for different thicknesses of marble.

4. The combination with a marble working machine having a rotating wheel, of a gage adapted to be attached to the machine in line with the wheel and above the marble, and being adjustable laterally and vertically.

5. The combination with a marble working machine having a rotating wheel of agglomerated material, a stop A, a vertical slide F, and an arm K, said stop being laterally adjustable relatively to said slide, and said slide being vertically adjustable relatively to said arm, and said arm being attachable to the machine so as to support said stop in line with and in advance of the wheel.

In witness whereof, I have hereunto signed my name in the presence of two subscribing witnesses.

JOHN ROYDEN PEIRCE.

Witnesses:
 DOMINGO A. USINA,
 THEODORE T. SNELL.